May 30, 1961  O. K. DOYLE  2,986,155
VALVE
Filed Oct. 25, 1957  4 Sheets-Sheet 1
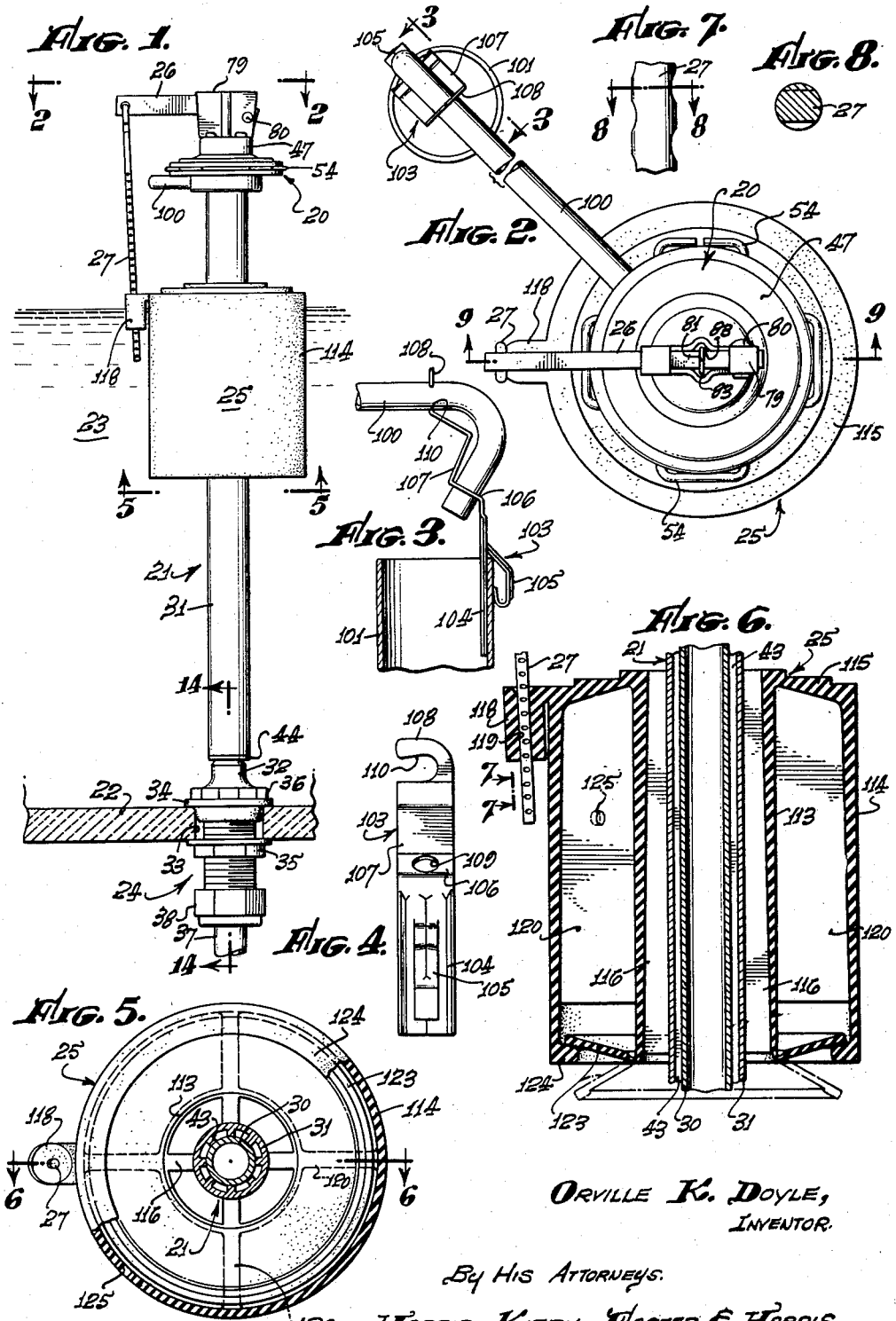
ORVILLE K. DOYLE,
INVENTOR.
By His Attorneys.
HARRIS, KIECH, FOSTER & HARRIS.

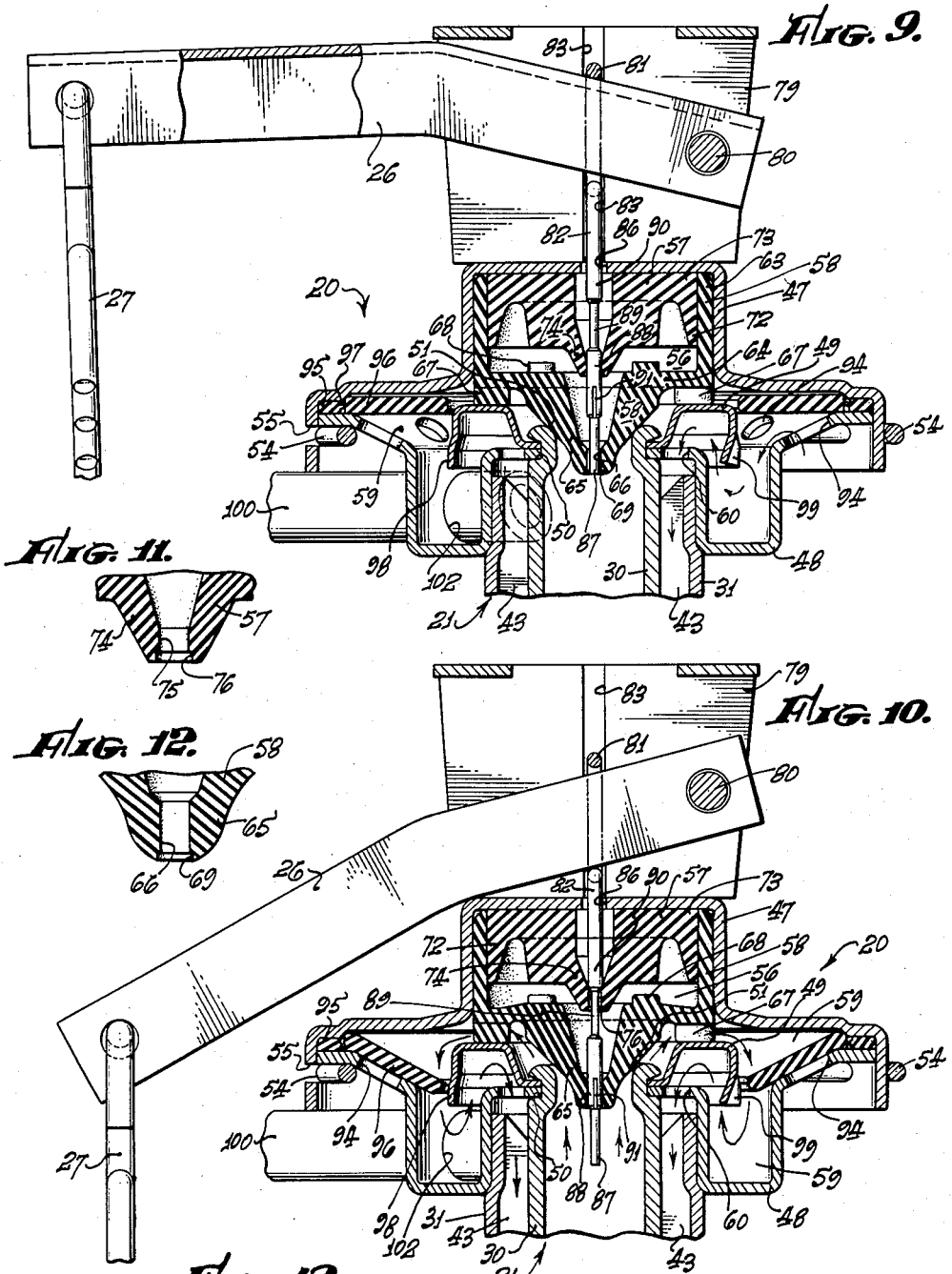

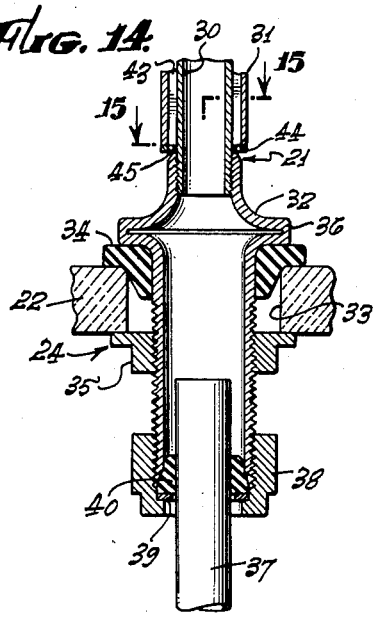
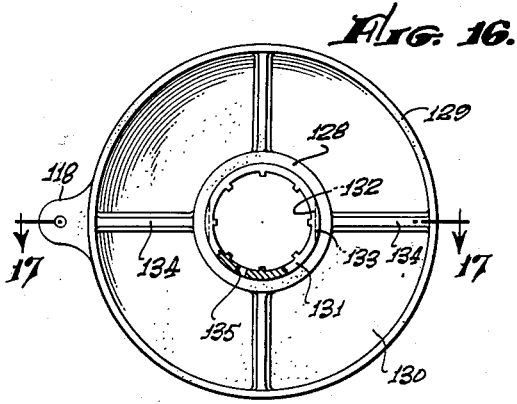
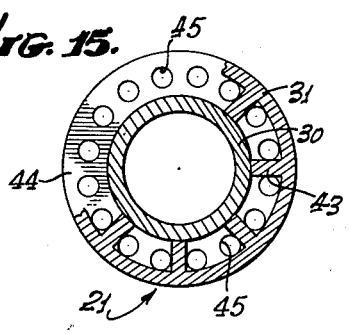
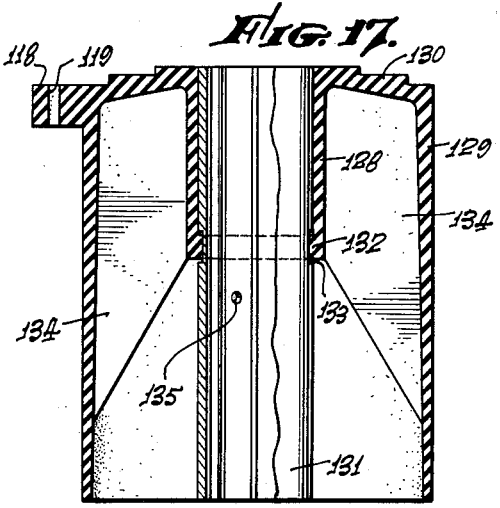

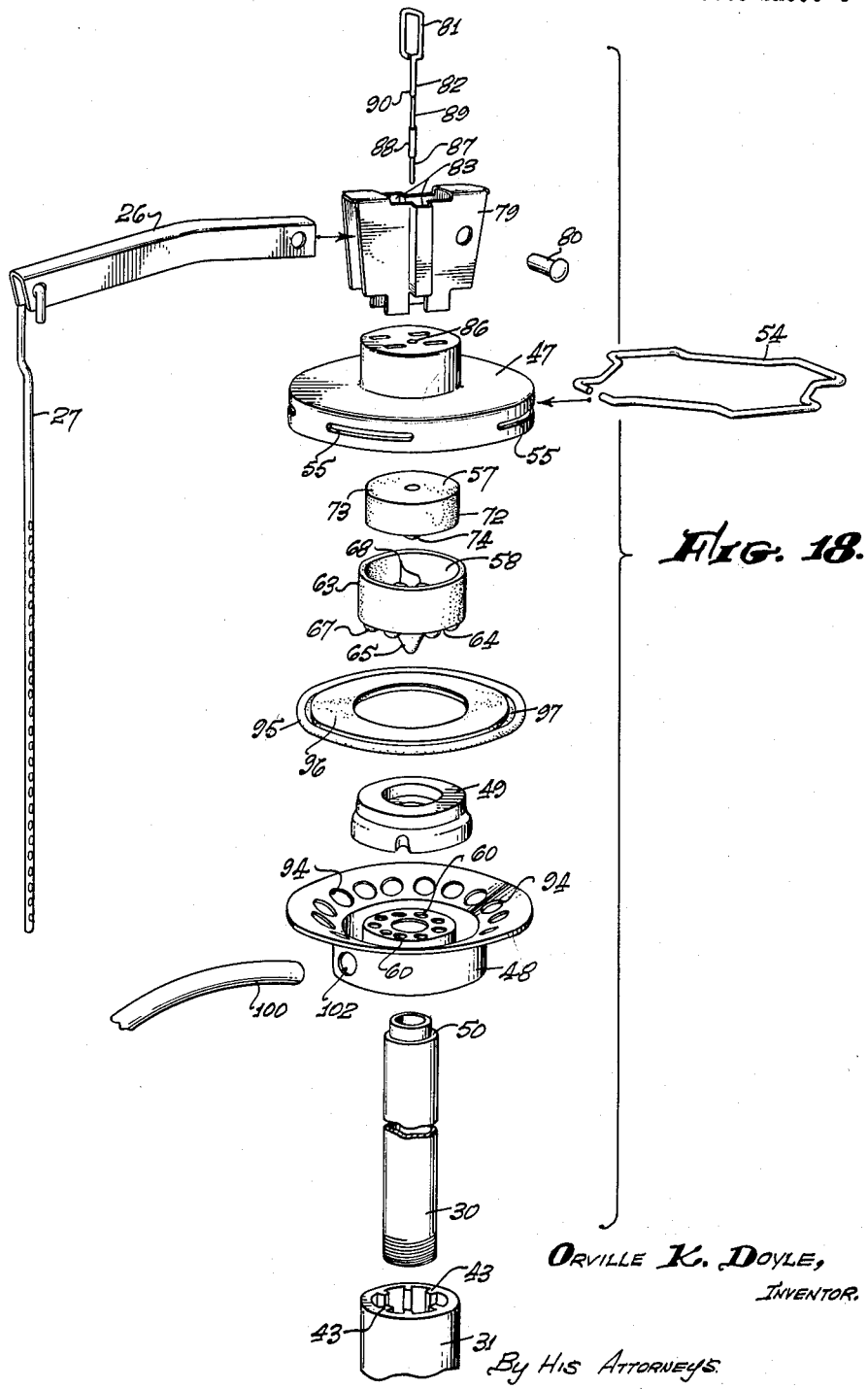

United States Patent Office 2,986,155
Patented May 30, 1961

2,986,155
VALVE
Orville K. Doyle, 11961 E. Los Palmas Drive, Fullerton, Calif.
Filed Oct. 25, 1957, Ser. No. 692,484
3 Claims. (Cl. 137—218)

This invention relates to valves and in particular to a valve which may be used in a flush tank or the like in substitution for the conventional ball cocks customarily used. Although the invention is described as incorporated in a flush tank valve, the principles thereof are manifestly applicable in other environments and to other uses.

It is an object of the invention to provide certain improvements on the ball cock valve described in my earlier patent entitled Ball Cock Valve, No. 2,808,850.

In the valve of the invention, a portion of the incoming fluid is channeled into a pressure chamber formed of a flexible, temporarily deformable material, the fluid under pressure exerting forces against the inner walls of the pressure chamber to make the chamber fluid tight, to hold the chamber in position, and to flex a wall of the chamber into engagement with a valve seat shutting off the flow of fluid through the valve. The incoming fluid enters the pressure chamber through a first passage and exits through a second passage, the two passages being sealed and opened by a single rod moving in both passages. It is an object of the invention to provide such a valve in which the rod has a plurality of operating surfaces therealong such that the valve always closes after emptying of the tank, even though the float, stopper and/or lever mechanisms malfunction, such valve also retaining the full flow rate, the nonhammer shutoff and the low operating pressure features of my earlier valves. Another object of the invention is to provide such a valve in which the sealing engagement of the rod and chamber which serves to block the passage connecting the incoming fluid to the pressure chamber has a slight discontinuity permitting leakage through the passage to expand the pressure chamber and positively close the valve in about fifteen to thirty minutes following opening of the valve.

It is another object of the invention to provide a valve in which the incoming fluid flows through an inlet pipe, over a valve seat and through an outlet chamber positioned around the inlet pipe with the outlet chamber having openings in a wall thereof adjacent the valve seat and with an anti-syphon seal positioned within the chamber, such that the seal is flexed into contact with the apertured wall of the outlet chamber to block the openings therein when fluid is flowing through the valve and to flex away from the wall when fluid flow is stopped in order to couple the outlet chamber with the surrounding atmosphere and prevent any syphoning action. A further object of the invention is to provide such an anti-syphon seal comprising an outer ring for clamping, an inner apertured disc, and a web joining the ring and disc for assembly as a single piece and permitting free floating action of the disc.

The valve of the invention may be operated with a hollow float positioned concentric with the standpipe supporting the valve, the float having sides and top and an open bottom forming an air trapping enclosure so that a substantial amount of water will enter the float through the bottom when the tank is filling and so that water will flow out of the tank faster than it flows out of the float when the tank is emptying, thereby increasing the downward force on the float due to gravity which serves to open the valve and start the filling operation. It is a further object of the invention to provide such a float with a small opening in the inner side thereof adjacent the standpipe, the inner side being spaced slightly from the standpipe permitting fluid flow along the standpipe past the side opening. Another object of the invention is to provide a float having a valve structure in the bottom thereof which permits fluid flow into the float only through the bottom. A further object of the invention is to provide a hollow float with a bottom closure which may be molded of a flexible material, the closure comprising a flap or flange having a relaxed or initial position from which it may be flexed to a closed or float sealing position and then flexed beyond the closed position to an open position, the flange urging itself from the open position towards the closed position.

Other improvements in valve construction and additional novel combinations and arrangements of parts will more fully appear in the course of the following description. The drawings merely show and the description merely describes preferred embodiments of the present invention which are given by way of illustration or example.

In the drawings, wherein like parts in different figures are designated by the same numerals:

Fig. 1 is a side view of a preferred embodiment of the invention shown mounted in a flush tank or the like;

Fig. 2 is an enlarged view taken along the line 2—2 of Fig. 1;

Fig. 3 is a partial sectional view taken along the line 3—3 of Fig. 2;

Fig. 4 shows the clip of Fig. 3 as a separate item;

Fig. 5 is an enlarged sectional view taken along the line 5—5 of Fig. 1;

Fig. 6 is a sectional view taken along the line 6—6 of Fig. 5;

Fig. 7 is an enlarged view taken along the line 7—7 of Fig. 6;

Fig. 8 is a sectional view taken along the line 8—8 of Fig. 7;

Fig. 9 is an enlarged sectional view taken along the line 9—9 of Fig. 2 showing the valve of the invention in the off or closed position;

Fig. 10 is a view similar to Fig. 9 showing the valve in the on or open position;

Fig. 11 is an enlarged view showing the center tip of the upper seal of Fig. 9;

Fig. 12 is an enlarged view showing the center tip of the lower seal of Fig. 9;

Fig. 13 is an enlarged view showing a portion of the anti-syphon seal of Fig. 9;

Fig. 14 is an enlarged sectional view taken along the line 14—14 of Fig. 1;

Fig. 15 is an enlarged sectional view taken along the line 15—15 of Fig. 14;

Fig. 16 is a bottom view of an alternative float for the invention, shown partly in section;

Fig. 17 is a sectional view taken along the line 17—17 of Fig. 16; and

Fig. 18 is an exploded view of a portion of the embodiment of Fig. 1.

Referring now to Fig. 1, the valve of the invention is contained in a housing 20 mounted atop a standpipe 21 which is fixed in a bottom 22 of a tank 23 by a coupling 24. A float 25 is also located in the tank 23 and is coupled to a valve actuating lever 26 by a float rod 27.

The standpipe 21 includes an inlet pipe 30 concentrically positioned within an outlet pipe 31, the lower end of the inlet pipe 30 being threadedly engaged with the upper end of a tube 32 of the coupling 24 (Fig. 14). The tube 32 is clamped in an opening 33 in the bottom 22 of the tank by a resilient washer 34 and a nut 35 which engages threads on the exterior of the tube 32. A plurality of flat surfaces are formed on an outwardly flared portion 36 of the tube 32 providing gripping surfaces for a wrench. A pipe 37, which is connected to the source of fluid for filling the tank, may be clamped to the lower end of the tube 32 by a threaded cap 38, a washer 39 and a resilient washer 40 so that when the cap 38 is screwed onto the tube 32, the resilient washer 40 will be compressed around the pipe 37 to clamp it in position.

The outlet pipe 31 may be provided with a plurality of ribs 43 projecting radially inward to engage the inlet pipe 30 for maintaining the two pipes in their relative positions and providing for fluid flow in the annular space between the pipes (Fig. 15). An apertured washer 44 rests on the top of the coupling tube 32 around the inlet pipe 30, with the bottom end of the outlet pipe preferably resting on the outer edge of the washer 44. The upper corner of the tube 32 is preferably chamfered permitting larger openings 45 in the washer and also for deflecting the downward flowing fluid.

It has been found that a quieter and more stable valve structure is obtained when there is some back pressure in the unit and therefore it is preferred to have the openings 45 in the washer 44 limit the rate of flow rather than doing so at a preceding point along the flow path.

The housing 20 includes an upper wall element or cap 47, a lower wall element or base 48 and a seal unit support or plate 49 (Figs. 9 and 10). The base 48 and plate 49 are fixed to the upper end of the standpipe by suitable means, such as by resting the base and plate on a shoulder 50 formed at the upper end of the inlet pipe 30 and rolling over the end of the inlet pipe to hold the parts in place, the rolled over end serving as a valve seat 51. The base 48 also telescopingly engages the upper end of the outlet pipe 31.

The cap 47 of the housing 20 is assembled to the base 48 by a snap ring 54 which passes through a plurality of openings 55 in the outer periphery of the cap 47 and slides under the outer flange of the base 48 (Figs. 2 and 9). This method of assembly permits the cap 47 and the lever 26 to be rotated relative to the standpipe after the standpipe and coupling are mounted in the bottom of the tank.

The housing 20 includes a pressure chamber 56 defined by a seal unit comprising an upper seal 57 and a lower seal 58, and an outlet chamber 59 defined by the cap 47 and base 48. When the valve is in the off position, the seal unit is caused to expand so that the lower seal 58 engages the valve seat 51, as seen in Fig. 9, blocking flow of fluid from the inlet pipe to the outlet chamber and outlet pipe. When the valve is in the on position, the lower seal 58 is in its normal or relaxed position, as shown in Fig. 10, permitting flow of fluid from the inlet pipe into the outlet chamber and through openings 60 in the base 48 into the outlet pipe, as shown by the arrows.

The upper and lower seals 57, 58 are telescopingly positioned within the cap 47 so as to be readily removable when the housing is disassembled, and are made of a flexible, temporarily deformable material, such as rubber. The lower seal 58 includes a cylindrical wall 63, a flexible wall or diaphragm 64 adjoining the lower edge of the wall 63, and a boss 65 extending downward from the central portion of the diaphragm with an opening 66 therethrough (Figs. 9 and 12). Spaced bosses 67 extend downward from the edge of the diaphragm 64 and rest on the plate 49 to space the diaphragm from the valve seat when the diaphragm is in the relaxed or valve open position. Spaced bosses 68 extend upward from the diaphragm 64 into the pressure chamber 56 preventing complete collapse of the pressure chamber under extreme pressure operations. The seals 57, 58 are preferably molded of rubber or the like and a small counter-bore 69 is provided at the lower end of the opening 66 to prevent molding flesh from extending into the opening.

The upper seal 57 includes a cylindrical wall 72, a flat portion or plate 73 adjoining the upper end of the wall 72, and a boss 74 extending downward from the plate into the pressure chamber, the boss having an opening 75 therethrough with a counterbore 76 at the lower end thereof (Figs. 10 and 11).

A bracket 79 with an inverted U-shape is fixed to the top of the cap 47 of the housing 20 by suitable means such as welding or clamping and the valve actuating lever 26 is pivotally mounted in the bracket 79 on a rivet 80 (Figs. 1, 2 and 9). The lever 26 is passed through an eye or loop 81 of a valve actuating rod 82 with the loop of the rod sliding in vertical grooves 83 in the walls of the bracket 79, thereby coupling the vertical movement of the float 25 to the valve actuating rod 82.

The valve actuating rod 82 slidingly engages the upper and lower seals 57, 58 at the openings 75, 66, respectively, passing through an opening 86 in the cap 47, and controls the flow of fluid into and out of the pressure chamber 56. The rod 82 is provided with an end section 87, a section 88 of greater cross-sectional area, a section 89, of lesser cross-sectional area, and another section 90 of greater cross-sectional area. Preferably, a portion of the section 88 adjacent the end section 87 is relieved, such as by an axial groove 91, to provide a discontinuity along the surface of the section 88. The lower portion of the section 88 may be relieved by other methods such as by providing scratches along the surface or by sandblasting, peening, etching, or the like to provide irregularities over the surface. Alternatively, a groove or other discontinuity may be provided in the inner face of the opening 66 of the lower seal 58.

When the valve is in the off position, as shown in Fig. 9, the end section 87 is positioned in the opening 66 and, being smaller than the opening, permits flow of fluid from the inlet pipe 30 into the pressure chamber 56. The section 88 of the rod is positioned in the opening 75 of the upper seal, blocking the opening. Fluid pressure in the pressure chamber acting over the entire surface of the diaphragm 64 of the lower seal forces the diaphragm downward into engagement with the valve seat 51 and prevents fluid flow from the inlet pipe to the outlet chamber and outlet pipe. When the tank is being emptied, the float moves downward and causes the rod 82 to also move downward. The section 89 of the rod is moved into the opening 75 of the upper seal and, being smaller than the opening, permits fluid flow from the pressure chamber to the surrounding atmosphere. Also, the section 88 of the rod is moved into the opening 66 of the lower seal, substantially blocking the opening. When the pressure chamber is permitted to exhaust, as described above, the diaphragm of the lower seal is raised to its normal position, as shown in Fig. 10, permitting fluid flow through the valve.

With the valve in the open position, the tank will normally fill in about half a minute. As the fluid level approaches the desired position, the float will cause the rod to move upward moving the section 88 of the rod into engagement with the opening in the upper seal and out of engagement with the opening in the lower seal, permitting the pressure chamber to fill with fluid from the inlet pipe to expand the chamber and shut off fluid flow.

An important feature of the present invention provides for shutting off the valve after a predetermined period of time when the tank does not fill due to some malfunction in the system. When the rod is at the lower extreme of its travel, as shown in Fig. 10, the section 90 of the rod will engage the opening 75 of the upper seal preventing fluid flow through the opening. At the same time, the relieved portion of the section 88 will be positioned in the opening 66 of the lower seal permitting very slight fluid flow from the inlet pipe to the pressure chamber. The relieved portion is so dimensioned that it preferably will require 15 to 30 minutes for sufficient fluid to flow through the opening 66 into the pressure chamber to expand the pressure chamber and close the valve. Of course the time period may be varied as desired. This construction prevents fluid flow through the valve for any extended period of time in the event the stopper in the tank does not seat properly, or the float becomes jammed or disengaged, or any other malfunction occurs.

It is required in most flush tank valve installations that means be provided for preventing syphoning of fluid through the valve. Openings 94 are provided in a side of the base 48 providing communication between the outlet chamber 59 and the surrounding atmosphere, the side of the base containing the openings preferably being frusto-conical in shape. These openings permit air flow into the outlet chamber and outlet pipe as shown by the arrows in Fig. 9, serving as an anti-syphon device. A deflectable anti-syphon flap is provided in the outlet chamber to cover the openings 94 and substantially prevent fluid flow through the openings when the valve is in the on position. A preferred form for the anti-syphon seal is shown in Figs. 9, 10 and 13, the seal comprising an outer ring 95 and an inner annular disc 96 joined by a thin web 97, the seal being formed of an elastic material such as rubber or the like. The seal is positioned between the cap and base when the housing is assembled, the outer ring 95 being clamped therebetween with the disc disposed within the outlet chamber 59.

The disc 96 is shown in its normal or relaxed position in Fig. 9, permitting air flow into the outlet chamber through the openings 94. When there is fluid flow from the inlet pipe into the outlet chamber, as shown in Fig. 10, the disc is deflected or stretched downward by the fluid to cover the openings 94. As soon as the fluid flow ceases, the disc returns to its normal position as shown in Fig. 9. It is not necessary that the disc 96 be formed with the ring 95 and web 97. However, this form is preferred because it permits the disc to be easily and accurately positioned in the outlet chamber during the assembly of the housing. The web 97 is made quite thin so as not to affect the flexibility of the disc and the web may break away during operation, as shown in Fig. 10, although this is not preferred.

Fluid flow takes place downward through the annular opening between the inner edge of the disc 96 of the anti-syphon seal and an outer wall 98 of the seal unit support on plate 49. It is preferred to maintain the size of this opening substantially constant and independent of the position of the anti-syphon flap, since such construction materially increases the operating range of the valve. In the embodiment shown herein, this opening is made substantially constant by outwardly flaring the wall 98 of the plate 49 so that the outer surface of the wall in vertical cross section approximates an arc of a circle with its center at the web 97 of the seal, as seen in Figs. 9 and 10. A dimple 99 in the wall 98 permits dirt and other particles to pass through the opening.

A tube 100 provides communication between the outlet chamber 59 and an overflow pipe 101 (Figs. 1 and 2), the tube preferably being of a flexible material, such as rubber or the like. One end of the tube is made a push-fit in an opening 102 in the outlet chamber (Fig. 9), the end of the tube being cut on a slant to prevent blocking of the tube by engagement with a wall of the housing. The burr occurring at the inner edge when the opening is formed is not removed, as it bites into the tube and retains the tube in the opening. The other end of the tube is held in position over the overflow pipe by a removable clip 103 which is shown in detail in Figs. 3 and 4. The clip 103 includes a vertical section 104 with a tab 105 bent out therefrom, the free end of the tab being bent under as shown in Fig. 3. The clip also includes an oblique section 106, a V section 107 and a vertical section 108, the oblique and vertical sections having openings 109, 110, therein respectively for receiving the tube 100. Thus the clip 103 may be firmly but removably attached to the upper end of the overflow pipe 101 and the tube 100 may be cut to size and laid in the clip along the arcuate section 107 through the openings 109 and 110. Due to the angle of the section 106, fluid from the tube 100 is directed against the wall of the pipe 101, instead of permitting a free fall down the pipe, in a quieter operating structure.

A preferred form for the float 25 is shown in detail in Figs. 5 and 6, the float being concentrically positioned about the standpipe 21. However, it is understood that the valve of the invention may be operated with a float positioned beside the standpipe or with the conventional ball type float. The float 25 is a hollow structure having concentric inner and outer walls 113, 114 and a top 115 joining the inner and outer walls. Ribs 116 project radially inward from the inner wall 113 serving as a guide for movement of the float along the standpipe. A boss 118 projects outward from the outer wall 114 and has an opening 119 therein which is a push-fit for the float rod 27, the float rod being formed with a plurality of dimples or serrations therealong for engagement with the material of the boss (Figs. 7 and 8). Stiffener ribs 120 are provided within the hollow float between the inner and outer walls.

The bottom of the float includes a flexible flap or flange 123 which acts as a check valve, permitting flow of fluid only into the float. The periphery of the flap 123 rests on an inturned shoulder 124 at the bottom of the outer wall 114 blocking flow of fluid from the float to the tank through the bottom of the float but permitting upward motion of the flap for flow of fluid into the float. This check valve structure is easily manufactured by molding the float of a flexible material such as rubber with the flap in the position shown in phantom lines in Fig. 6. Then the flap is pushed past the shoulder 124 to the position shown in solid lines in Fig. 6 and the resiliency of the flap material urges the flap into engagement with the shoulder 124, thereby requiring a certain amount of pressure to deflect the flap and permit fluid flow into the float.

A small opening 125 is provided in the outer wall 114 of the float. As the tank is being filled with fluid, fluid will pass into the float past the flap 123 and a portion of the air trapped within the float will escape through the opening 125. However, when the tank is emptied, the check valve flap 123 will retain this water within the float, thereby making the float quite heavy providing positive action for the valve mechanism. This form of construction allows the float to be light in weight and inexpensive to manufacture, yet to serve as a heavy float when actually in operation.

An alternative form for the float is shown in Figs. 16 and 17, wherein the float comprises inner and outer walls 128, 129 joined by a top 130 with a guide tube 131 fitted within the inner wall 128 and located by engagement of shoulders 132 on the inner wall and corresponding slots 133 in the guide tube. Ribs 134 are provided between the inner and outer walls to rigidify the structure and minimize sliding friction.

A small opening 135 is provided in the guide tube 131 providing communication between the interior of the float and the annular space between the guide tube and the standpipe. When the small opening is placed in the inner wall rather than in the outer wall of the float, it is not visible to the user of the valve, therefore avoiding misguided attempts to seal the opening.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In combination with a valve having an inlet pipe providing a source of a fluid, a valve seat positioned adjacent an end of said inlet pipe, and means for engaging said valve seat to block flow of fluid from said inlet pipe, an outlet chamber positioned around said inlet pipe and providing for flow of fluid away from said valve seat, said outlet chamber having at least one opening in the wall thereof communicating with surrounding atmosphere; an apertured disc of elastic material, said disc including an outer ring and an annular flexible web connecting said ring and said apertured disc; means clamping said outer ring within said outlet chamber, said disc being movable from an upper relaxed position to a lower frusto-conical position engaging said chamber wall and blocking said opening therein, said disc being movable to its lower position by flow of fluid from said inlet pipe to said outlet chamber; and a flow defining member mounted in said chamber and positioned concentrically within said apertured disc, with said disc movable upward toward and downward away from said member providing a fluid flow passage between said member and disc in all positions of said disc.

2. In combination with a valve having an inlet pipe providing a source of a fluid, a valve seat positioned adjacent an end of said inlet pipe, and means for engaging said valve seat to block flow of fluid from said inlet pipe, an outlet chamber positioned around said inlet pipe and providing for flow of fluid away from said valve seat, said outlet chamber including an inner wall, an upper wall and a lower wall, said lower wall being frusto-conical in shape and having at least one opening therein communicating with surrounding atmosphere; and a seal ring of resilient material including an outer ring clamped between said upper and lower walls and an inner apertured disc and an annular flexible web connecting said outer ring and apertured disc, said disc being movable from an upper relaxed position to a lower frusto-conical position, and in its relaxed position resting adjacent said upper wall, said disc being deflectable against said lower wall when moved to said frusto-conical position by the flow of fluid from the inlet pipe to said outlet chamber to cover said opening, said disc being movable upward toward and downward away from said inner wall to provide a fluid passage therebetween in all positions of said disc.

3. In combination with a valve having an inlet pipe providing a source of a fluid, a valve seat positioned adjacent an end of said inlet pipe, and means for engaging said valve seat to block flow of fluid from said inlet pipe, an outlet chamber positioned around said inlet pipe and providing for flow of fluid away from said valve seat, said outlet chamber including an inner wall, an upper wall and a lower wall, said lower wall being frusto-conical in shape and having a plurality of openings therein communicating with surrounding atmosphere; and a seal ring of resilient material positioned in said outlet chamber, said seal including an outer ring clamped in a plane between said upper and lower walls and an inner apertured disc, and an annular flexible web connecting said outer ring and apertured disc, said disc being movable from an upper relaxed position to a lower frusto-conical position, and in its relaxed position lying in said plane adjacent said upper wall, said disc being deflectable against said lower wall when moved to said frusto-conical position by the flow of fluid from said inlet pipe to said outlet chamber to cover said openings, said disc being movable upward toward and downward away from said inner wall to provide a fluid passage therebetween in all positions of said disc.

References Cited in the file of this patent

UNITED STATES PATENTS

| | | |
|---|---|---|
| 1,465,370 | Smith | Aug. 21, 1923 |
| 1,701,967 | Bartels | Feb. 12, 1929 |
| 1,878,001 | Sloan | Sept. 20, 1932 |
| 2,161,441 | Vickers | June 6, 1939 |
| 2,699,316 | Mosher | Jan. 11, 1955 |
| 2,746,477 | Krause et al. | May 22, 1956 |
| 2,752,938 | Owens | July 3, 1956 |
| 2,779,350 | Owens | Jan. 29, 1957 |
| 2,791,235 | Smith | May 7, 1957 |
| 2,808,850 | Doyle | Oct. 8, 1957 |
| 2,809,656 | Goldtrap | Oct. 15, 1957 |
| 2,827,260 | Jordan | Mar. 19, 1958 |

UNITED STATES PATENT OFFICE
CERTIFICATE OF CORRECTION

Patent No. 2,986,155                                May 30, 1961

Orville K. Doyle

It is hereby certified that error appears in the above numbered patent requiring correction and that the said Letters Patent should read as corrected below.

Column 6, line 8, after "pipe," insert -- resulting --; column 7, line 11, for "positioned" read -- position --.

Signed and sealed this 24th day of October 1961.

(SEAL)
Attest:

ERNEST W. SWIDER
Attesting Officer

DAVID L. LADD
Commissioner of Patents

USCOMM-DC